US011812341B2

(12) United States Patent
Herschfelt et al.

(10) Patent No.: US 11,812,341 B2
(45) Date of Patent: *Nov. 7, 2023

(54) HYPER-PRECISE POSITIONING AND COMMUNICATIONS SYSTEM AND NETWORK

(71) Applicant: Arizona Board of Regents on behalf of Arizona State University, Scottsdale, AZ (US)

(72) Inventors: Andrew Herschfelt, Phoenix, AZ (US); Daniel W. Bliss, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,490

(22) Filed: Nov. 8, 2021

(65) Prior Publication Data
US 2022/0060857 A1 Feb. 24, 2022

Related U.S. Application Data

(62) Division of application No. 16/787,300, filed on Feb. 11, 2020, now Pat. No. 11,172,334.
(Continued)

(51) Int. Cl.
*H04W 4/029* (2018.01)
(52) U.S. Cl.
CPC .................. *H04W 4/029* (2018.02)
(58) Field of Classification Search
CPC ................ H04W 4/02; H04W 4/029
See application file for complete search history.

(56) References Cited

U.S. PATENT DOCUMENTS

| 4,648,099 A | 3/1987 | Kerr | |
| 5,510,800 A * | 4/1996 | McEwan | G08G 1/04 342/465 |

(Continued)

FOREIGN PATENT DOCUMENTS

| CA | 2298812 A1 | 1/2000 |
| EP | 2137547 B1 | 3/2008 |

OTHER PUBLICATIONS

Bliss, D., "Cooperative radar and communications signaling: The estimation and information theory odd couple," 2014 IEEE Radar Conference, May 19-23, 2014, Cincinnati, OH, USA, IEEE, 6 pages.
(Continued)

*Primary Examiner* — Qutbuddin Ghulamali
(74) *Attorney, Agent, or Firm* — Withrow & Terranova, P.L.L.C.; Vincent K. Gustafson

(57) ABSTRACT

A hyper-precise positioning and communications (HPPC) system and network are provided. The HPPC system is a next-generation positioning technology that promises a low-cost, high-performance solution to the need for more sophisticated positioning technologies in increasingly cluttered environments. The HPPC system is a joint positioning-communications radio technology that simultaneously performs relative positioning and secure communications. Both of these tasks are performed with a single, co-use waveform, which efficiently utilizes limited resources and supports higher user densities. Aspects of this disclosure include an HPPC system for a network which includes an arbitrary number of network nodes (e.g., radio frequency (RF) devices communicating over a joint positions-communications waveform). As such, networking protocols and design of data link and physical layers are described herein. An exemplary embodiment extends the HPPC system for use with existing cellular networks, such as third generation
(Continued)

partnership project (3GPP) long term evolution (LTE) and fifth generation (5G) networks.

20 Claims, 7 Drawing Sheets

Related U.S. Application Data

(60) Provisional application No. 62/803,800, filed on Feb. 11, 2019.

(56) References Cited

U.S. PATENT DOCUMENTS

| | | | |
|---|---|---|---|
| 5,592,181 A * | 1/1997 | Cai | G01S 5/04 342/442 |
| 6,204,812 B1 | 3/2001 | Fattouche | |
| 6,421,330 B1 | 7/2002 | Chung et al. | |
| 6,611,234 B2 * | 8/2003 | Fullerton | H04B 1/7183 342/463 |
| 6,687,507 B2 | 2/2004 | Fischer et al. | |
| 7,173,919 B1 * | 2/2007 | Dabak | H04B 1/707 370/335 |
| 7,286,624 B2 | 10/2007 | Woo et al. | |
| 7,639,730 B2 | 12/2009 | Rasmussen | |
| 7,710,321 B2 | 5/2010 | Heidari-Bateni et al. | |
| 8,184,504 B2 | 5/2012 | Altman et al. | |
| 8,253,627 B1 | 8/2012 | Burgess | |
| 8,442,172 B1 | 5/2013 | Dokania et al. | |
| 9,019,159 B2 | 4/2015 | van Puijenbroek et al. | |
| 9,060,342 B2 | 6/2015 | Wu | |
| 9,756,599 B2 | 9/2017 | Fischer | |
| 9,774,996 B1 | 9/2017 | Frydman et al. | |
| 9,883,348 B1 | 1/2018 | Walker et al. | |
| 10,681,669 B2 | 6/2020 | Priyanto et al. | |
| 2003/0080902 A1 | 5/2003 | Roberts | |
| 2005/0047427 A1 | 3/2005 | Kashima et al. | |
| 2007/0109188 A1 | 5/2007 | Zimmerman et al. | |
| 2008/0165059 A1 | 7/2008 | Karr | |
| 2009/0285339 A1 * | 11/2009 | Zhang | H04J 13/10 375/343 |
| 2010/0226454 A1 | 9/2010 | Bliss et al. | |
| 2010/0271263 A1 | 10/2010 | Moshfeghi | |
| 2010/0273506 A1 | 10/2010 | Stern-Berkowitz et al. | |
| 2010/0304708 A1 | 12/2010 | McCrady et al. | |
| 2011/0158200 A1 | 6/2011 | Bachu et al. | |
| 2012/0026041 A1 | 2/2012 | Murdock et al. | |
| 2012/0169542 A1 | 7/2012 | Mathews et al. | |
| 2013/0184011 A1 | 7/2013 | Kaushansky | |
| 2013/0285856 A1 | 10/2013 | Opshaug et al. | |
| 2014/0105054 A1 | 4/2014 | Saegrov et al. | |
| 2014/0186037 A1 | 7/2014 | Dahlfort et al. | |
| 2015/0282112 A1 | 10/2015 | Bialer et al. | |
| 2016/0252624 A1 | 9/2016 | MacCurdy et al. | |
| 2016/0302165 A1 | 10/2016 | Da et al. | |
| 2017/0003376 A1 | 1/2017 | Wellman et al. | |
| 2017/0367065 A1 | 12/2017 | Seth et al. | |
| 2018/0227877 A1 | 8/2018 | Gunnarsson et al. | |
| 2019/0200164 A1 | 6/2019 | Sanderovich et al. | |
| 2020/0260225 A1 | 8/2020 | Herschfelt et al. | |
| 2020/0319330 A1 | 10/2020 | Bliss | |

OTHER PUBLICATIONS

Brown III, D.R. et al., "Non-Hierarchical Clock Synchronization for Wireless Sensor Networks," arXiv:1212.1216v1 [nlin.AO], Dec. 6, 2012, 8 pages.
Chiriyath, A. et al., "Inner Bounds on Performance of Radar and Communications Co-Existence," IEEE Transactions on Signal Processing, vol. 64, Issue 2, Sep. 2015, IEEE, pp. 464-474.
Chiriyath, A.R. et al., "Joint radar-communications performance bounds: Data versus estimation information rates," MILCOM 2015—2015 IEEE Military Communications Conference, Oct. 26-28, 2015, Tampa, FL, USA, IEEE, 6 pages.
Chiriyath, A. et al., "Radar-Communications Convergence: Coexistence, Cooperation, and Co-Design," IEEE Transactions on Cognitive Communications and Networking, vol. 3, No. 1, Feb. 2017, IEEE, 13 pages.
Gelb, A., "Applied optimal estimation," MIT press, Apr. 1974, 192 pages.
Gutierrez, R. et al., "Joint radar-communications system implementation using software defined radios: Feasibility and results," 2017 51st Asilomar Conference on Signals, Systems, and Computers, Oct. 29-Nov. 1, 2017, Pacific Grove, CA, USA, IEEE, 6 pages.
Herschfelt, A., "Simultaneous Positioning and Communications:Hybrid Radio Architecture, Estimation Techniques, and Experimental Validation," A Dissertation Presented in Partial Fulfillment of the Requirement for the Degree Doctor of Philosophy, Arizona State University, Dec. 2019, 119 pages.
Paul, B. et al., "Constant information radar for dynamic shared spectrum access," 2015 49th Asilomar Conference on Signals, Systems and Computers, Nov. 8-11, 2015, Pacific Grove, CA, USA, IEEE, 5 pages.
Paul, B. et al., "Extending joint radar-communications boundsfor fmcw radar with doppler estimation," 2015 IEEE Radar Conference(RadarCon), May 10-15, 2015, Arlington, VA, USA, IEEE, 6 pages.
Paul, B. et al., "Joint communications and radar performance bounds under continuous waveform optimization: The waveform awakens," 2016 IEEE Radar Conference (RadarConf), May 2-6, 2016, Philadelphia, PA, USA, IEEE, 6 pages.
Paul, B. et al., "The Constant Information Radar," Entropy, vol. 18, No. 9, Sep. 2016, MDPI, 23 pages.
Non-Final Office Action for U.S. Appl. No. 16/767,043, dated Apr. 11, 2022, 23 pages.
Bidigare, P. et al., "Attaining Fundamental Bounds on Timing Synchronization," 2012 IEEE International Conference on Acoustics, Speech and Signal Processing (ICASSP 2012), Mar. 25-30, 2012, Kyoto, Japan, IEEE, pp. 5229-5232.
Bidigare, P. et al., "Initial Over-the-Air Performance Assessment of Ranging and Clock Synchronization Using Radio Frequency Signal Exchange," 2012 IEEE Statistical Signal Processing Workshop (SSP), Aug. 5-8, 2012, Ann Arbor, MI, IEEE, pp. 273-276.
Bliss, D. et al., "Adaptive Wireless Communications: MIMO Channels and Networks," 2013, Cambridge University Press, 619 pages.
Busse, F.D. et al., "Demonstration of Adaptive Extended Kalman Filter for Low-Earth-Orbit Formation Estimation Using CDGPS," Navigation: Journal of the Institute of Navigation, vol. 50, No. 2, Summer 2003, pp. 79-93.
Denis, B. et al., "Joint Distributed Synchronization and Positioning in UWB Ad Hoc Networks Using TOA," IEEE Transactions on Microwave Theory and Techniques, vol. 54, No. 4, Apr. 2006, IEEE, pp. 1896-1911.
Guvenc, I. et al., "A Survey on TOA Based Wireless Localization and NLOS Mitigation Techniques," IEEE Communications Surveys & Tutorials, vol. 11, No. 3, Third Quarter 2009, IEEE, pp. 107-124.
Kay, S.M., "Fundamentals of Statistical Signal Processing, vol. I: Estimation Theory," 1993, Prentice Hall, 303 pages.
Kim, H., "Double-Sided Two-Way Ranging Algorithm to Reduce Ranging Time," IEEE Communications Letters, vol. 13, No. 7, Jul. 2009, IEEE, pp. 486-488.
Lanzisera, S. et al., "Radio Frequency Time-of-Flight Distance Measurement for Low-Cost Wireless Sensor Localization," IEEE Sensors Journal, vol. 11, No. 3, Mar. 2011, IEEE, pp. 837-845.
Li, Q. et al., "Global Clock Synchronizationin Sensor Networks," IEEE Transactions on Computers, vol. 55, No. 2, Feb. 2006, IEEE, pp. 214-226.
Li, X.R. et al., "Survey of Maneuvering Target Tracking. Part I: Dynamic Models," IEEE Transactions on Aerospace and Electronic Systems, vol. 34, No. 4, Oct. 2003, IEEE, pp. 1333-1364.
Liu, H. et al., "Survey of Wireless Indoor Positioning Techniques and Systems," IEEE Transactions on Systems, Man, and Cybernetics—Part C: Applications and Reviews, vol. 37, No. 6, Nov. 2007, IEEE, pp. 1067-1080.

(56) References Cited

OTHER PUBLICATIONS

Mills, D.L. et al., "Internet Time Synchronization: The Network Time Protocol," IEEE Transactions on Communications, vol. 39, No. 10, Oct. 1991, IEEE, pp. 1482-1493.

Mills, D.L., "Network Time Protocol (Version 3) Specification, Implementation and Analysis," Network Working Group, Request for Comments: 1305, Mar. 1992, 120 pages.

Oh, D.-G., "A Novel Time Delay Estimation Using Chirp Signals Robust to Sampling Frequency Offset for a Ranging System," IEEE Communications Letters, vol. 14, No. 5, May 2010, IEEE, pp. 450-452.

Paul, B. et al., "Survey of RF Communications and Sensing Convergence Research," Survey of RF Communications and Sensing Convergence Research, vol. 5, 2017, IEEE, 20 pages.

Pelka, M. et al., "Evaluation of time-based ranging methods: Does the choice matter?," 2017 14th Workshop on Positioning, Navigation and Communications (WPNC), Oct. 25-26, 2017, Bremen, IEEE, 6 pages.

Sundararaman, B. et al., "Clock synchronization for wireless sensor networks: a survey," Ad Hoc Networks, vol. 3, Issue 3, 2005, Elsevier B.V., pp. 281-323.

Zucca, C. et al., "The Clock Model and Its Relationship with the Allan and Related Variances," IEEE Transactions on Ultrasonics, Ferroelectrics, and Frequency Control, vol. 52, No. 2, Feb. 2005, IEEE, pp. 289-296.

International Search Report and Written Opinion for International Patent Application No. PCT/US2018/066763, dated Apr. 29, 2019, 10 pages.

International Preliminary Report on Patentability for International Patent Application No. PCT/US2018/066763, dated Jul. 2, 2020, 7 pages.

Non-Final Office Action for U.S. Appl. No. 16/787,300, dated May 12, 2021, 9 pages.

Notice of Allowance for U.S. Appl. No. 16/787,300, dated Sep. 3, 2021, 8 pages.

Herschfelt, A. et al., "Spectrum Management and Advanced Receiver Techniques (SMART): Joint Radar-Communications Network Performance," 2018 IEEE Radar Conference (RadarConf18), Apr. 23-27, 2018, Oklahoma City, OK, USA, IEEE, 6 pages.

Ma, O. et al., "Cooperative Radar and Communications Coexistence Using Reinforcement Learning," 2018 52nd Asilomar Conference on Signals, Systems, and Computers, Oct. 28-31, 2018, IEEE, Pacific Grove, CA, IEEE, 5 pages.

Rong, Y. et al., "MIMO Radar and Communications Spectrum Sharing: A Multiple-Access Perspective," 2018 IEEE 10th Sensor Array and Multichannel Signal Processing Workshop (SAM), Jul. 8-11, 2018, Sheffield, UK, IEEE, 5 pages.

Non-Final Office Action for U.S. Appl. No. 17/089,074, dated Nov. 18, 2022, 18 pages.

Notice of Allowance for U.S. Appl. No. 16/767,043, dated Mar. 22, 2023, 9 pages.

Applicant-Initiated Interview Summary for U.S. Appl. No. 17/089,074, dated Jan. 27, 2023, 6 pages.

Non-Final Office Action and Examiner-Initiated Interview Summary for U.S. Appl. No. 17/089,086, dated Mar. 22, 2023, 20 pages.

Final Office Action for U.S. Appl. No. 17/089,074, dated Apr. 19, 2023, 17 pages.

Advisory Action for U.S. Appl. No. 17/089,074, dated Jul. 28, 2023, 3 pages.

\* cited by examiner

VALUES SHOWN FOR NORMAL CP ASSIGNMENT; Δf = 15 kHz

HYPER-PRECISE POSITIONING AND COMMUNICATIONS SYSTEM AND NETWORK

RELATED APPLICATIONS

This application is a division of U.S. patent application Ser. No. 16/787,300, filed Feb. 11, 2020, subsequently issued as U.S. Pat. No. 11,172,334 on Nov. 9, 2021, which claims the benefit of U.S. Provisional Patent Application Ser. No. 62/803,800, filed Feb. 11, 2019, wherein the entire disclosures of the foregoing applications and patent are hereby incorporated by reference herein.

This application is related to International Patent Application No. PCT/US2018/066763, filed Dec. 20, 2018, entitled "PHASE-ACCURATE VEHICLE POSITIONING SYSTEMS AND DEVICES," the disclosure of which is hereby incorporated herein by reference in its entirety.

FIELD OF THE DISCLOSURE

This disclosure relates to systems and devices which provide vehicle positional information and communications using radio networks.

BACKGROUND

Positioning systems are used to provide information regarding relative positions of objects. For example, vehicle positioning systems assist operators in travel and operation of air and ground vehicles. For example, aircraft positioning systems assist operators of various aircraft, particularly in critical tasks such as landing. Such positioning systems enable takeoff and landing in low visibility conditions through autonomous systems or presenting pilots with information which enables more accurate manual operation. Aircraft positioning systems are also critical for remote controlled tasks, such as drone operation.

Traditionally, vehicle positioning systems have required tradeoffs between accuracy of measurement and spectral efficiency—where more accurate positioning has required higher-bandwidth signals. Modern vehicle systems demand increasingly sophisticated positioning technologies in increasingly cluttered environments. In addition, vehicle positioning signals have traditionally been segregated from communications signals, requiring dedicated spectrum for each. Thus, legacy radio systems do not support modern performance requirements or user densities.

SUMMARY

A hyper-precise positioning and communications (HPPC) system and network are provided. The HPPC system is a next-generation positioning technology that promises a low-cost, high-performance solution to the need for more sophisticated positioning technologies in increasingly cluttered environments. This technology offers extreme ranging precision (e.g., <5 centimeters (cm)) with minimal bandwidth (e.g., 10 megahertz (MHz)), a secure communications link to protect against cyberattacks, a small form factor that enables integration into numerous platforms, and minimal resource consumption which supports high-density networks. This system operates with minimal infrastructure and is highly reconfigurable to execute a variety of missions.

The HPPC system is a joint positioning-communications radio technology that simultaneously performs relative positioning and secure communications. Both of these tasks are performed with a single, co-use waveform, which efficiently utilizes limited resources and supports higher user densities. Network nodes within an HPPC network perform the positioning task using a cooperative, point-to-point protocol to estimate position states (e.g., relative position and orientation) of the network nodes in the network. The communications task distributes positioning information (e.g., time information for clock alignment, estimated position states, etc.) and/or additional information between network nodes and secures the positioning task against cyberattacks. This technology may be installed in ground stations, ground vehicles, unmanned aerial systems (UASs), and airborne vehicles, enabling a highly-mobile, reconfigurable network.

Aspects of this disclosure include an HPPC system for a network which includes an arbitrary number of network nodes (e.g., radio frequency (RF) devices communicating over a joint positioning-communications waveform). As such, networking protocols and design of data link and physical layers are described herein. An exemplary embodiment extends the HPPC system for use with existing cellular networks, such as third generation partnership project (3GPP) long term evolution (LTE) and fifth generation (5G) networks.

This technology has numerous applications to modern vehicle systems. High-precision relative positioning enables applications such as collision avoidance, automated landing, navigation, and formation control. Secure network communications enable a distributed knowledge base, real-time traffic conditions, and air traffic management, and when combined with the positioning task maintains distributed coherence between users. The system flexibility allows quick and easy installation in areas without existing coverage, providing immediate support in situations such as disaster relief or forward operating bases. This technology further supports automation of vehicular transport by providing a cooperative medium between users, enabling vehicle-to-vehicle communications and remote control.

An exemplary embodiment of this disclosure provides a method for sending joint positioning and communications. The method includes estimating a position state relative to a network node and generating a joint positioning-communications waveform. The joint positioning-communications waveform includes a preamble; a data payload; a first positioning sequence; and a second positioning sequence. The method further includes transmitting a first signal comprising the joint positioning-communications waveform, wherein the data payload of the first signal comprises the position state.

Another exemplary embodiment of this disclosure provides a method for receiving and processing joint positioning and communications. The method includes receiving a first signal comprising a joint positioning-communications waveform from a network node, the joint positioning-communications waveform comprising: a preamble; a data payload, wherein the data payload of the first signal comprises a first position state of the network node; a first positioning sequence; and a second positioning sequence. The method further includes estimating a second position state relative to the network node from the first signal.

Another exemplary embodiment of this disclosure provides a network for joint positioning and communications. The network includes a first network node, comprising: a first signal transceiver configured to communicate wirelessly with a second network node and a first signal processor. The first signal processor is operable to estimate a first position state of the first network node relative to the second network node and generate a joint positioning-communications waveform. The joint positioning-communications waveform includes a preamble; a data payload; a first positioning sequence; and a second positioning sequence. The first signal processor is further operable to cause the first signal transceiver to transmit a first signal comprising the joint positioning-communications waveform, wherein the data payload of the first signal comprises the first position state.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
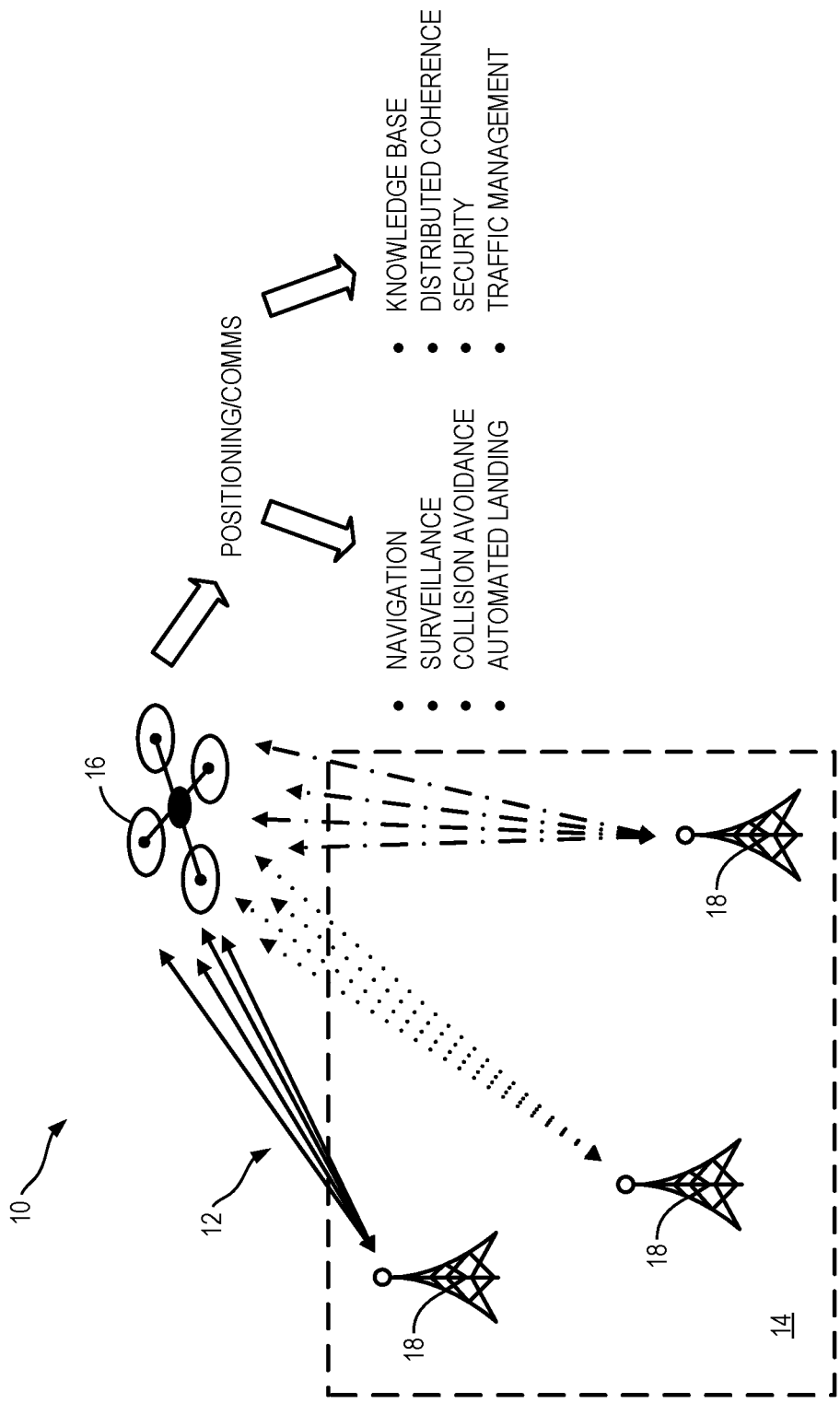
FIG. 1 is a schematic diagram of an exemplary network for joint positioning and communications, referred to herein as a hyper-precise positioning and communications (HPPC) network.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A hyper-precise positioning and communications (HPPC) system and network are provided. The HPPC system is a next-generation positioning technology that promises a low-cost, high-performance solution to the need for more sophisticated positioning technologies in increasingly cluttered environments. This technology offers extreme ranging precision (e.g., <5 centimeters (cm)) with minimal bandwidth (e.g., 10 megahertz (MHz)), a secure communications link to protect against cyberattacks, a small form factor that enables integration into numerous platforms, and minimal resource consumption which supports high-density networks. This system operates with minimal infrastructure and is highly reconfigurable to execute a variety of missions.

The HPPC system is a joint positioning-communications radio technology that simultaneously performs relative positioning and secure communications. Both of these tasks are performed with a single, co-use waveform, which efficiently utilizes limited resources and supports higher user densities. Network nodes within an HPPC network perform the positioning task using a cooperative, point-to-point protocol to estimate position states (e.g., relative position and orientation) of the network nodes in the network. The communications task distributes positioning information (e.g., time information for clock alignment, estimated position states, etc.) and/or additional information between network nodes and secures the positioning task against cyberattacks. This technology may be installed in ground stations, ground vehicles, unmanned aerial systems (UASs), and airborne vehicles, enabling a highly-mobile, reconfigurable network.

Aspects of this disclosure include an HPPC system for a network which includes an arbitrary number of network nodes (e.g., radio frequency (RF) devices communicating over a joint positioning-communications waveform). As such, networking protocols and design of data link and physical layers are described herein. An exemplary embodiment extends the HPPC system for use with existing cellular networks, such as third generation partnership project (3GPP) long term evolution (LTE) and fifth generation (5G) networks.

This technology has numerous applications to modern vehicle systems. High-precision relative positioning enables applications such as collision avoidance, automated landing, navigation, and formation control. Secure network communications enable a distributed knowledge base, real-time traffic conditions, and air traffic management, and when combined with the positioning task maintains distributed coherence between users. The system flexibility allows quick and easy installation in areas without existing coverage, providing immediate support in situations such as disaster relief or forward operating bases. This technology further supports automation of vehicular transport by providing a cooperative medium between users, enabling vehicle-to-vehicle communications and remote control.

FIG. 1 is a schematic diagram of an exemplary network for joint positioning and communications, referred to herein as an HPPC network 10. In the HPPC network 10, RF signals 12 are exchanged between network nodes using a joint positioning-communications waveform in order to facilitate estimation of position information of the network nodes. In the illustrated example, the network nodes include a base station 14 (e.g., a first network node) and an aircraft 16 (e.g., a second network node, such as a UAS). In an exemplary aspect, the aircraft 16 can estimate its position information (e.g., range, position, orientation, and/or acceleration) relative to the base station 14 from the exchanged RF signals 12. In some examples, the base station 14 (and each additional network node in the HPPC network 10) can likewise estimate such position information.

The position information of the aircraft 16 can be used for various tasks, such as formation flying, coordination of safe flight paths, takeoff, landing, and taxiing. In some examples, the RF signals 12 can also carry payload data for communications between the aircraft 16 and the base station 14 or other network nodes in the HPPC network 10. Such payload data may facilitate additional tasks, such as coordination of a formation of aircraft 16.

As illustrated in FIG. 1, the base station 14 can be a distributed base station having multiple antennas 18 to provide more accurate and/or detailed position information (e.g., in addition to range, multiple antennas can provide position and orientation estimation). Similarly, the aircraft 16 can have a multi-antenna RF transceiver. In an illustrative example, the aircraft 16 has a four-antenna transceiver and the base station 14 has three antennas 18, such that twelve RF signals 12 are exchanged between the base station 14 and the aircraft 16 to facilitate improved estimation of position information.

In an exemplary aspect, the HPPC network 10 operates with a 10 MHz bandwidth and maintains a ranging standard deviation below 5 cm for up to 2 kilometers (km) of range. In controlled configurations, this deviation can be driven as low as 1 millimeter (mm). This capability is facilitated by a phase accurate time-of-arrival (ToA) estimation technique and a distributed phase-coherence algorithm, described further below.

It should be understood that while FIG. 1 is described with respect to aircraft 16 in particular, exemplary embodiments may include other types of RF devices, including vehicles. For example, a radio-bearing automobile in the HPPC network 10 may facilitate relevant positioning tasks, such as parking, street navigation, and awareness of other vehicles for passing, accelerating, stopping, and so on. A radio-bearing ship in the HPPC network 10 can facilitate relevant positioning tasks such as navigation, formation travel, collision avoidance, docking, and so on. Embodiments of the present disclosure implemented in such vehicles may be used for assisted operation, remote control, autonomous systems, and so on. In other examples, the network nodes of the HPPC network 10 can include an automobile, ship, train, or other vehicle, or non-vehicular applications where position information is needed or beneficial.

Figure 2:
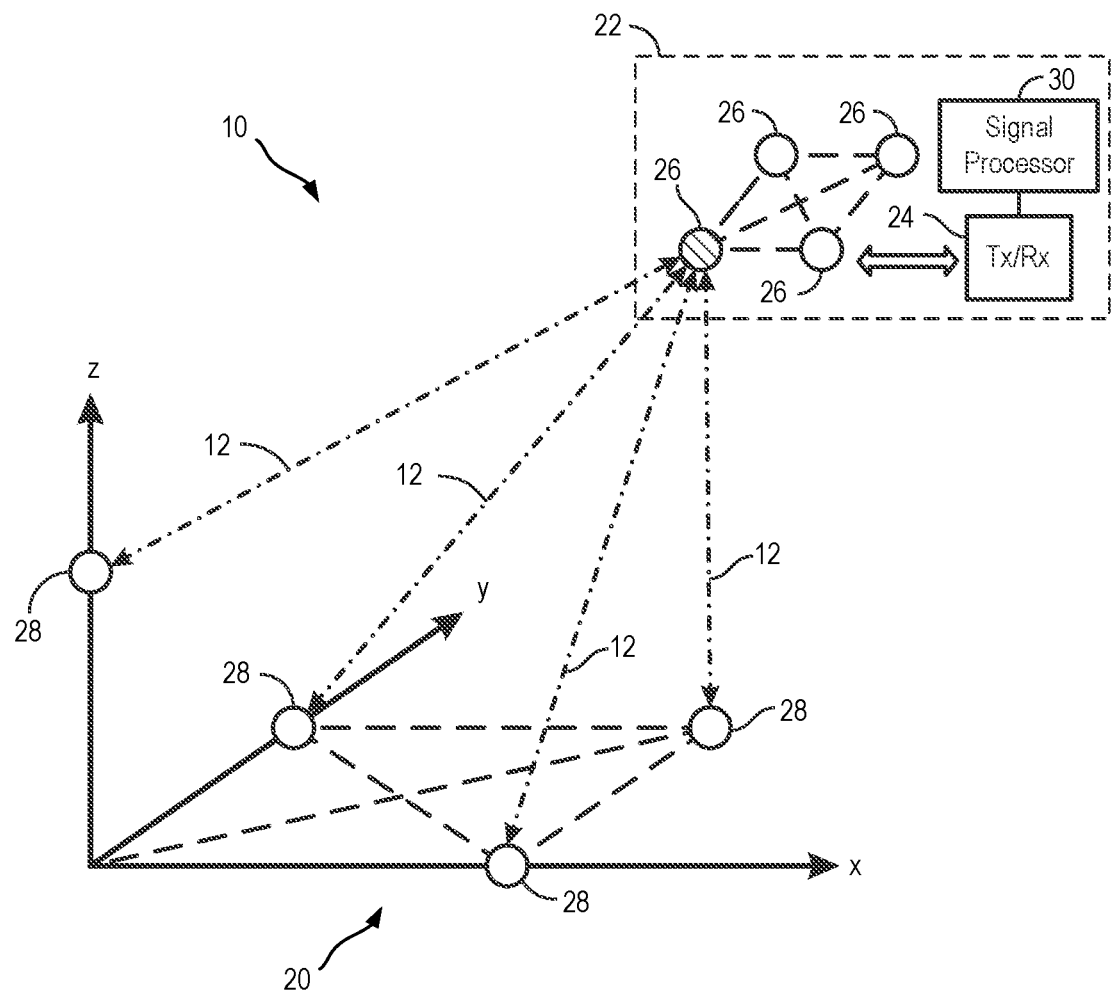
FIG. 2 is a schematic diagram of the HPPC network of FIG. 1, illustrating estimation of position information based on exchanging radio frequency (RF) signals between a first network node and a second network node.

FIG. 2 is a schematic diagram of the HPPC network 10 of FIG. 1, illustrating estimation of position information based on exchanging RF signals 12 between a first network node 20 and a second network node 22. Each network node 20, 22 can be a base station (e.g., the first network node can be the base station 14 of FIG. 1) or a vehicle (e.g., the second network node can be the aircraft 16 of FIG. 1). In addition, each network node 20, 22 in the HPPC network 10 can also include or be implemented as an RF device. For example, the second network node 22 includes an RF transceiver 24. The RF transceiver 24 is coupled to one or more antennas 26, through which the RF transceiver 24 can communicate wirelessly with the first network node 20 (e.g., at each of one or more antennas 28).

In an exemplary aspect, the RF transceiver 24 includes an RF receiver and an RF transmitter for communicating wirelessly over RF signals 12. In some examples, the RF transceiver 24 can communicate over cellular or non-cellular RF frequency bands, citizens broadband radio service (CBRS) frequency bands, over microwave frequency bands, over millimeter wave (mmWave) frequency bands, over optical frequency bands, and so on. In some examples, the RF transceiver 24 exchanges signals having a narrow bandwidth, such as 10 MHz or less. In some examples, the RF transceiver 24 exchanges signals over an LTE, 5G, or other 3GPP cellular communication signal.

As illustrated in FIG. 2, the RF transceiver 24 can couple to an array of antennas 26. Each of the antennas 26 of the second network node 22 may exchange RF signals 12 with each of multiple antennas 28 of the first network node 20 (and additional network nodes in the HPPC network 10). The second network node 22 further includes a signal processor 30 coupled to the RF transceiver 24 to process the RF signals 12 exchanged with the first network node 20. By processing the RF signals 12, the signal processor 30 can estimate a position state of the second network node 22 based on relative distances between the antennas 26 of the second network node 22 and each of the antennas 28 of the first network node 20. The position state can estimate relative range, position, velocity, acceleration, bearing, altitude and/or orientation of the second network node 22. The position state estimates can be fused with additional information (e.g., additional information received via the HPPC network 10, inertial measurement data, sensor data) to refine the relative and/or absolute position of the second network node 22.

Aspects of the present disclosure describe the HPPC network 10, which includes a plurality of such network nodes 20, 22 that simultaneously perform positioning and communications tasks. Simultaneously implementing communications and positioning tasks enables numerous secondary functions with fewer resources. Network nodes 20, 22 within the HPPC network 10 communicate with their neighbors while simultaneously estimating the position and orientation of each nearby network node 20, 22.

Position estimation is performed by estimating the time-of-flight (ToF) between each transmit-receive antenna pair (e.g., an antenna 28 of the first network node 20 and an antenna 26 of the second network node 22). These ToF estimates are converted into distance estimates, which drive position and orientation estimators (e.g., the position state). ToF estimation is enabled by the simultaneous communications link (e.g., via the RF signals 12), in which time information is shared between network nodes, which in turn drives a synchronization algorithm that precisely aligns their clocks. This alignment enables high-precision ToF estimation, thus enabling high-precision position and orientation estimation.

In this regard, system design of the HPPC network 10 includes the following:

1. Time-of-Flight Estimation: The HPPC positioning task is performed by estimating the ToF between each transmit-receive antenna pair between two network nodes 20, 22. ToF is estimated by finding the difference between the transmit and receive times of the joint positioning-communications waveform. The transmit time is known to the transmitter, and shared with the receiver via the communications link. The receive time (ToA) is estimated by the receiver. ToA is estimated by correlating the received signal against a known reference sequence. If the radio clocks are well aligned, the phase of the received signal may be leveraged to improve the quality of this estimate well beyond its intrinsic resolution. This is further described below with respect to FIGS. 3A and 3B.

2. Time Synchronization Algorithm: To achieve high-precision position estimates, the radio clocks must be well aligned, which enables high-precision ToA estimation. A modern extension to the Network Timing Protocol (NTP) is developed which synchronizes two network nodes 20, 22 operating in the HPPC network 10. This algorithm estimates the time offset and ToF between two network nodes 20, 22 as they alternate transmitting and receiving. Derivatives of these variables are tracked and leveraged to refine these estimates. This provides the network nodes 20, 22 with the necessary information to synchronize their clocks well enough to achieve phase-accurate ToA estimation. This is further described below with respect to FIG. 3C.

3. Joint Positioning-Communications Waveform Design: The positioning and communications tasks are performed simultaneously with a single co-use waveform, as described further below with respect to FIG. 4A. A novel waveform is designed that incorporates the necessary elements of each task. This waveform consists of a communications preamble, communications payload, communications postamble, positioning waveforms, and a second communications postamble. The preamble is a fixed sequence and known to all receivers. The communications payload contains the state space estimates produced by the synchronization algorithm, the timestamp information necessary to estimate the ToF, and auxiliary hardware information. In some examples, the positioning waveforms are pseudo-random waveforms that are transmitted from each antenna using a code-division duplexing (CDD) approach (as described with respect to FIG. 4B) or a time division duplexing (TDD) approach (as described with respect to FIG. 4C), and are known to the receiver. The preamble and postambles are used to make coarse and fine frequency offset estimates for the communications processing chain.

Figure 4A:
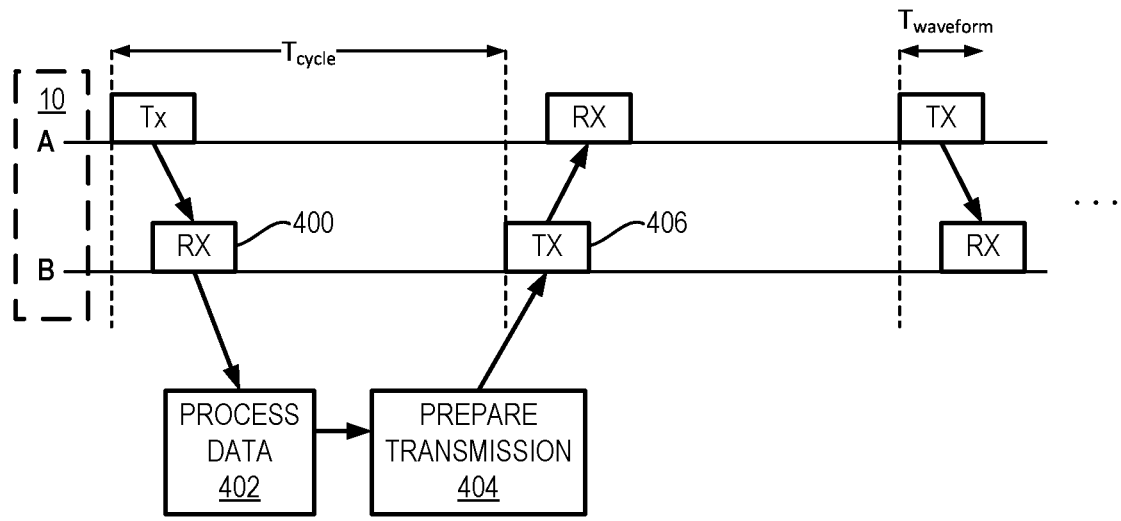
FIG. 4A is a schematic diagram of interactions between network nodes of the HPPC network of FIG. 2, illustrating an example protocol of the joint positioning-communications waveform.
Figure 4B:
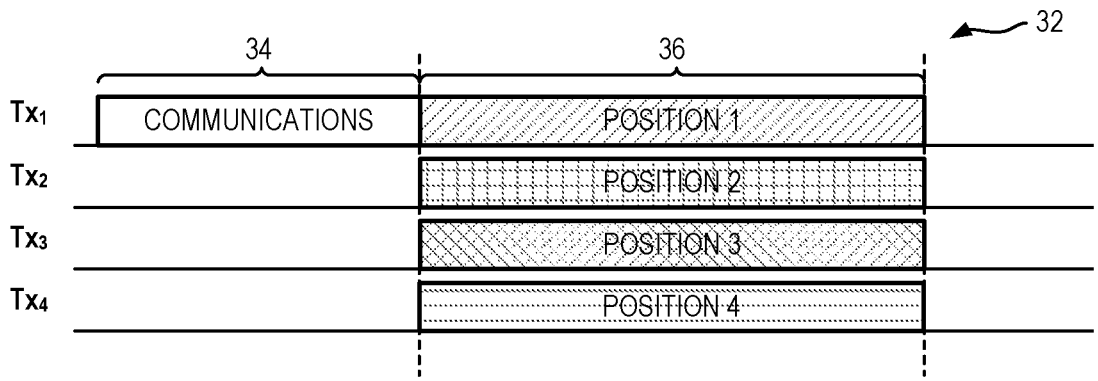
FIG. 4B is a schematic diagram of an exemplary structure of the joint positioning-communications waveform using the protocol of FIG. 4A.
Figure 4C:
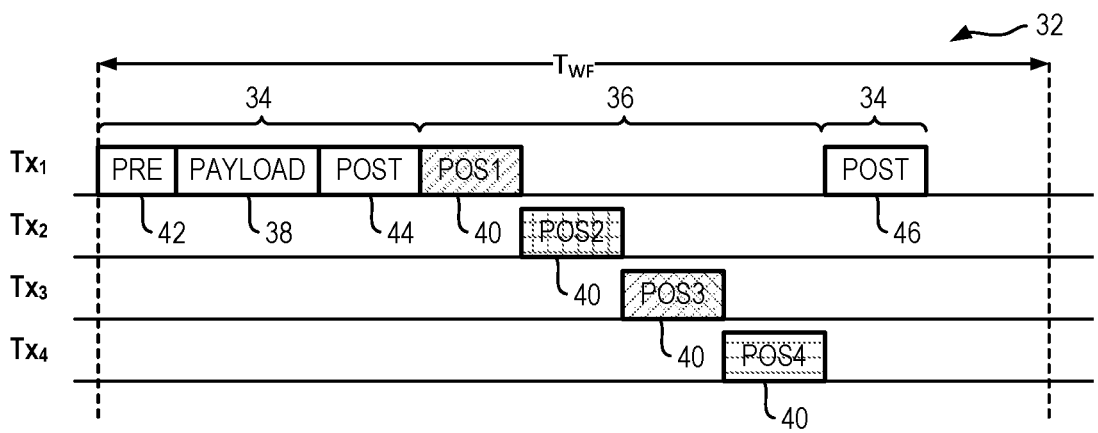
FIG. 4C is a schematic diagram of another exemplary structure of the joint positioning-communications waveform using the protocol of FIG. 4A.

The HPPC network 10 further requires a medium access protocol that controls how and when network nodes 20, 22 access the spectrum, and how resources are divided among network nodes 20, 22 within the HPPC network 10. This includes regulating the length of each transmission, how often and in what frequency ranges each network node 20, 22 may transmit, and how network nodes 20, 22 are added or removed from the HPPC network 10. This also includes consolidating data from multiple network nodes 20, 22 and expressing it in a meaningful and useful representation. An exemplary protocol using the waveform of FIGS. 4A-4C is described with respect to FIG. 5. An extension of the HPPC system for LTE and 5G cellular communications networks is described further with respect to FIGS. 6A-6C.

Figure 3A:
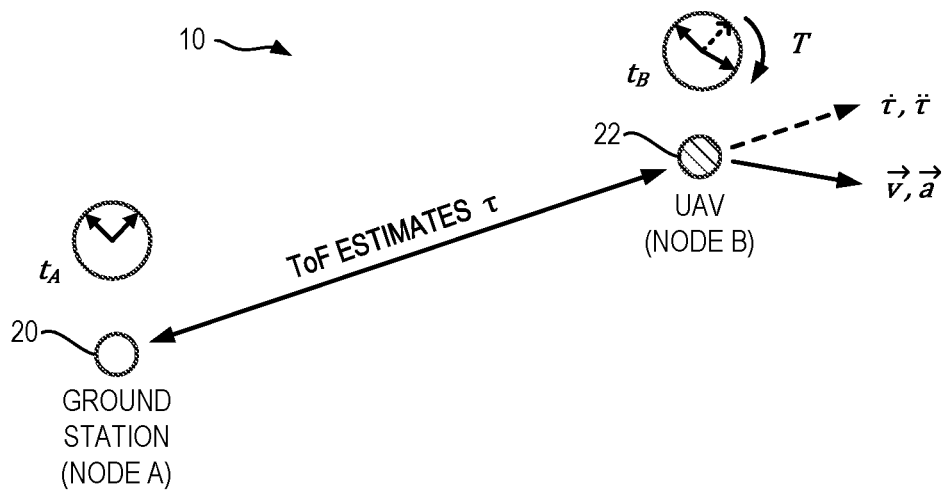
FIG. 3A is a schematic diagram of the HPPC network, illustrating a clock offset between the first network node (e.g., node A) and the second network node (e.g., node B) of FIG. 2.

FIG. 3A is a schematic diagram of the HPPC network 10, illustrating a clock offset between the first network node 20 (e.g., node A) and the second network node 22 (e.g., node B) of FIG. 2. For illustrative purposes, the first network node 22 (illustrated as node A) can be assumed to be stationary and tethered to the ground while the second network node 22 (illustrated as node B) is airborne, moving with a velocity $\vec{v}$ and acceleration $\vec{a}$ in a three-dimensional Cartesian space.

Nodes A and B are driven by independent clocks and they communicate over a single-input-single-output (SISO) line-of-sight environment. The two nodes sequentially exchange communications waveforms that include transmit $t_{(\cdot),Tx}$ and receive $t_{(\cdot),Rx}$ timestamps. These timestamps are leveraged to estimate the stochastic processes, relative clock offsets (T) and propagation time (e.g., ToF ($\tau$)) between the two nodes. Radial velocity $\dot{\tau}$ and acceleration $\ddot{\tau}$ act along the dashed line. Proposed methods readily generalize to multiple node networks operating on multi-antenna platforms.

Figure 3B:
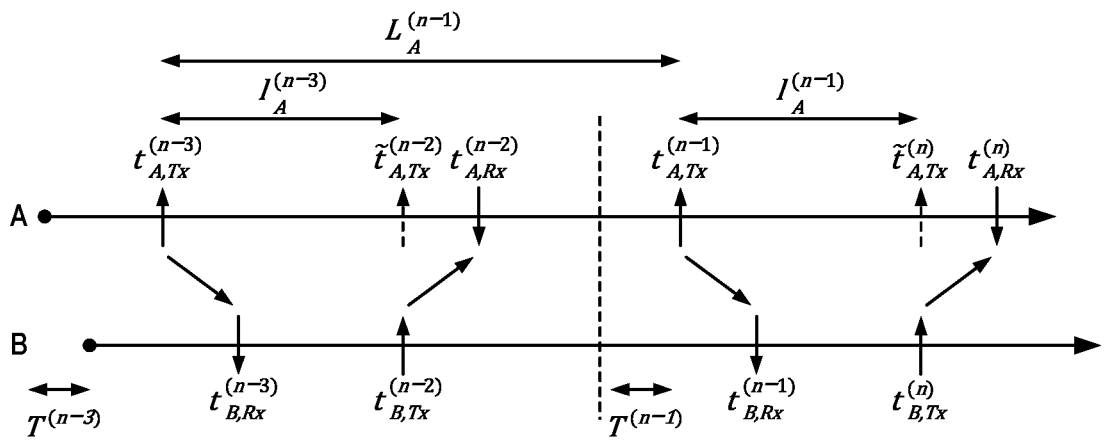
FIG. 3B is a flow diagram illustrating an exemplary timing exchange model at node A of FIG. 3A for two cycles using a joint positioning-communications waveform.

FIG. 3B is a flow diagram illustrating an exemplary timing exchange model at node A of FIG. 3A for two cycles using a joint positioning-communications waveform. Each cycle can span two frames, and the cycles are separated by time $L_A$, indicated by a dashed line. Designated master node A transmits the joint positioning-communications waveform to node B in the first frame, node B waits for an agreed frame separation l and transmits it back to node A during the second frame. The transmit timestamp $t_{B,Tx}^{(n)}$ is perceived by node A as $\tilde{t}_{A,Tx}^{(n)}$ (shown in dashed line) and frame length l as $l_A$ due to clock offset T.

Figure 3C:
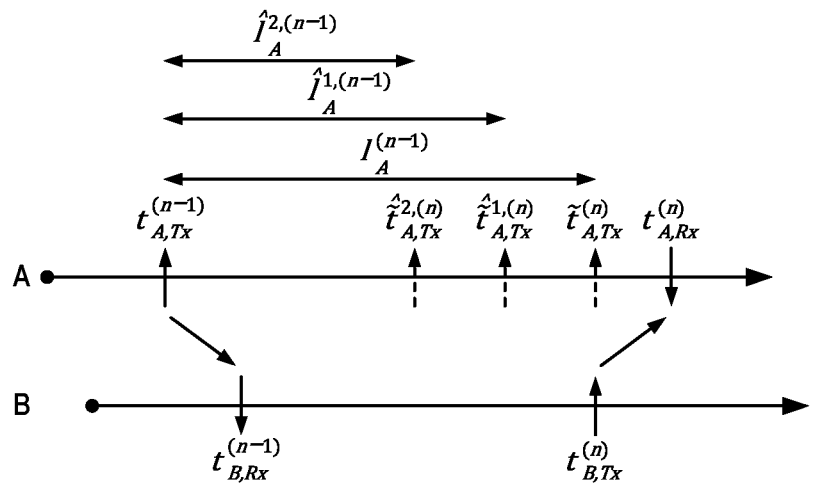
FIG. 3C is a flow diagram illustrating the timing exchange model of FIG. 3B at node A of FIG. 3A for two frames, referenced with respect to an estimation and tracking model.

FIG. 3C is a flow diagram illustrating the timing exchange model of FIG. 3B at node A of FIG. 3A for two frames, referenced with respect to an estimation and tracking model.

With reference to FIGS. 3A-3C, the two nodes A and B sequentially exchange timing information via the joint positioning-communications waveform, which is then translated to corresponding timestamps using phase-accurate ToA estimation methods. These timestamps are denoted by $t_{(\cdot),(\cdot)}^{(\cdot)}$, in which the first subscript indicates the node at which the event occurs, the second subscript indicates if it was a transmit or receive event, and the superscript is an indication of frame during which the event occurs. The transmit timestamps are assumed to be known with certainty while the receive timestamps are a result of phase-accurate ToA estimation, hence represented as $\hat{t}_{(\cdot),Rx}^{(\cdot)}$. Two successive frames comprise a cycle that is $L^{(\cdot)}$ seconds (s) long and is represented as $\{(k), (k+1)\}$ where the successive frames (k) and (k+1) are $1^{(\cdot)}$ s apart. Despite scheduling, the nodes disagree on time hence making frame length dependent on the evaluating node $1_A^{(\cdot)}$ or $1_B^{(\cdot)}$.

Timing Exchange and Position State Estimation

With continuing reference to FIG. 3B, during a cycle $\{(n-1), (n)\}$, designated master node A transmits a communication packet to node B in the first frame (n−1), node B waits for an agreed frame separation l and transmits a packet to node A during the second frame (n). Each packet comprises a transmit time stamp $t_{(\cdot),Tx}$ of the transmitting node along with communication payload. Exemplary embodiments are concerned with estimating clock offset (T) and relative ToF (τ) between the two nodes for the cycle containing $(n-1)^{th}$ and $(n)^{th}$ frames while making an assumption that estimates of these parameters for previous cycles are available.

For a transmission from node A to node B, during frame (n−1), node B will receive the signal at time:

$$\hat{t}_{B,Rx}^{(n-1)} = t_{A,Tx}^{(n-1)} + \hat{\tau}^{(n-1)} - \hat{T}^{(n-1)} \qquad \text{Equation 1}$$

whereas for a transmission from node B to node A, during frame (n), node A will receive the signal at time:

$$\hat{t}_{A,Rx}^{(n)} = t_{B,Tx}^{(n)} + \hat{\tau}^{(n)} + \hat{T}^{(n)} \qquad \text{Equation 2}$$

The two nodes A and B are required to transmit every frame separated by l. However, oscillator offset and drifts within the nodes force the frame length l to be time dependent and different for each node. Therefore, the transmit timestamp $t_{B,Tx}^{(n)}$ is perceived by node A as $\tilde{t}_{A,Tx}^{(n)}$ due to clock discrepancies:

$$\tilde{t}_{A,Tx}^{(n)} = t_{B,Tx}^{(n)} + \hat{T}^{(n)} \qquad \text{Equation 3}$$

Also, frame length l measures to $l_A$ and cycle separation L to $L_A$ respectively on clock driving node A, which for the current cycle of interest become:

$$\hat{l}_A^{(n-1)} = \tilde{t}_{A,Tx}^{(n)} - t_{A,Tx}^{(n-1)} \qquad \text{Equation 4}$$

$$L_A^{(n-1)} = t_{A,Tx}^{(n-1)} - t_{A,Tx}^{(n-3)} \qquad \text{Equation 5}$$

These formulations are used herein to aid delay and offset estimation.

Position states of the network nodes 20, 22 (e.g., node A and node B) can be estimated using an approach that not only synchronizes clocks on the two network nodes 20, 22, but also estimates ToF between them. For example, a first-order Markov model using propagation delay τ and clock time offset T can provide an optimal and time efficient position state estimate. In addition, a second-order Markov model extends position state estimates to include radial acceleration ($\ddot{\tau}$) and clock frequency drift ($\dot{T}$). This accounts for any varying radial acceleration between the network nodes 20, 22 (e.g., produced by the flight path node B traverses).

Tracking Algorithm

With continuing reference to FIG. 3C, in an exemplary aspect, one or more of the parameters described above (e.g., relative ToF between nodes A and B, relative radial velocity between nodes A and B, relative radial acceleration between nodes A and B, relative time offset between clocks A and B, relative frequency offset between clocks A and B, relative frequency drift between clocks A and B) is tracked and used to improve position state estimates. In some embodiments, the position state estimates are tracked using a modified version of the extended Kalman filter (EKF) algorithm.

As suggested earlier, enough information to jointly estimate the parameters of interest are accrued only every cycle. An exemplary aspect deploys tracking once every cycle and extrapolates these results to derive estimates for both the corresponding frames. The Kalman filtering method can be visualized as a two-step algorithm—1) Prediction and 2) Correction.

The prediction step can include an array of predictions made based on the assumed models on transition of state and measurement parameters in time along with their error metrics. Using these predictions, state space variables are corrected by evaluating a weighted sum of state predictions and deviation of measurement predictions from observations.

With continuing reference to FIG. 3C, the transmit timestamp $t_{B,Tx}^{(n)}$ is perceived by node A as $\tilde{t}_{A,Tx}^{(n)}$ and frame length l as $1_A^{(n-1)}$ due to clock offset T. Exemplary embodiments estimate these parameters as $\tilde{t}_{B,Tx}^{i,(n)}$ and $\hat{l}_A^{i,(n-1)}$ where i indicates the different methods (e.g., first order, second order) whose estimates are shown in FIG. 3C. The joint offset and clock synchronization approach is therefore extended with EKF tracking methods that track the position state estimates in time (e.g., delay, offset, radial acceleration, and clock frequency drift estimates, along with other parameters of interest).

HPPC Protocol and Waveform

FIG. 4A is a schematic diagram of interactions between network nodes 20, 22 of the HPPC network 10 of FIG. 2, illustrating an example protocol of the joint positioning-communications waveform. The first network node 20 (node A) and the second network node 22 (node B) alternate between transmitting and receiving periodically over the joint positioning-communications waveform. For example, at operation 400 node B receives a first signal from node A, which includes the joint positioning-communications waveform. At operation 402, node B processes the received data to produce an estimated position state, which can include estimating the ToA of all positioning sequences on all receive channels (e.g., as described above with respect to FIGS. 3A-3C) and extracting timing information from a data payload of the joint positioning-communications waveform.

In some examples, to support additional network nodes in the HPPC network 10 without sacrificing quality of service, spatially adaptive interference mitigation techniques may also be employed at operation 402. The multi-antenna nature of devices in the HPPC network 10 affords spatial diversity that enables a variety of spatial interference mitigation techniques. Adaptive techniques also allow the system to adapt to network nodes entering and exiting the network, time-varying external interference, changing network environments, and evolving channels. The adaptive techniques may address the following:

1. Internal Interference: Adding network nodes to the HPPC network 10 also increases the number of potential interferes that each must mitigate. Due to the cooperative nature of this system, however, successive interference cancellation (SIC) techniques are a feasible approach to interference mitigation. SIC requires that a receiver reconstructs an estimate of an interfering signal, then subtract it from the signal it originally received. Network nodes within the HPPC network 10 share information about how their waveforms are built, so this reconstruction is tractable. Mutual interference may also be limited by adaptively coordinating power levels across the HPPC network 10 and adaptively scheduling time and frequency slots for different network nodes.

2. External Interference: The HPPC network 10 must also contend with already congested spectral environments, in which it may not have knowledge of the interferers. In this case, the spatial diversity afforded by the multi-antenna platforms may be leveraged to implement spatial beamforming, in which an antenna array is adjusted to maximize incoming energy in the direction of other network nodes and minimizing incoming energy from the interferers. This process must also be adaptive to compensate for interferers that move within the environment.

At operation 404, node B prepares a transmission, in which node B assembles the position state information from operation 402 using the joint positioning-communications waveform. At operation 406, node B transmits the joint positioning-communications waveform back to node A using a second signal. Transmissions are scheduled by a master node (e.g., one of the first network node 20 and the second network node 22, or another node). In some examples, the transmissions occur every 50 milliseconds (ms) (e.g., the cycle duration $T_{cycle}$ is 50 ms). In some examples, the joint positioning-communications waveform has a duration ($T_{waveform}$) of about 1 ms. This transfer of information drives the timing synchronization and ToF estimation algorithm, as described above with respect to FIGS. 3A-3C.

Network operations for RF and other network devices (e.g., node A, node B) are governed by a suite of network protocols that define the system operations at multiple hierarchical levels. The most common model of this protocol suite is the Open Systems Interconnect (OSI) model, which divides the network protocols into 7 layers. These layers are responsible for different levels of network operations, ranging from how data is physically transferred through the network to how that data is used to implement applications.

Figure 5:
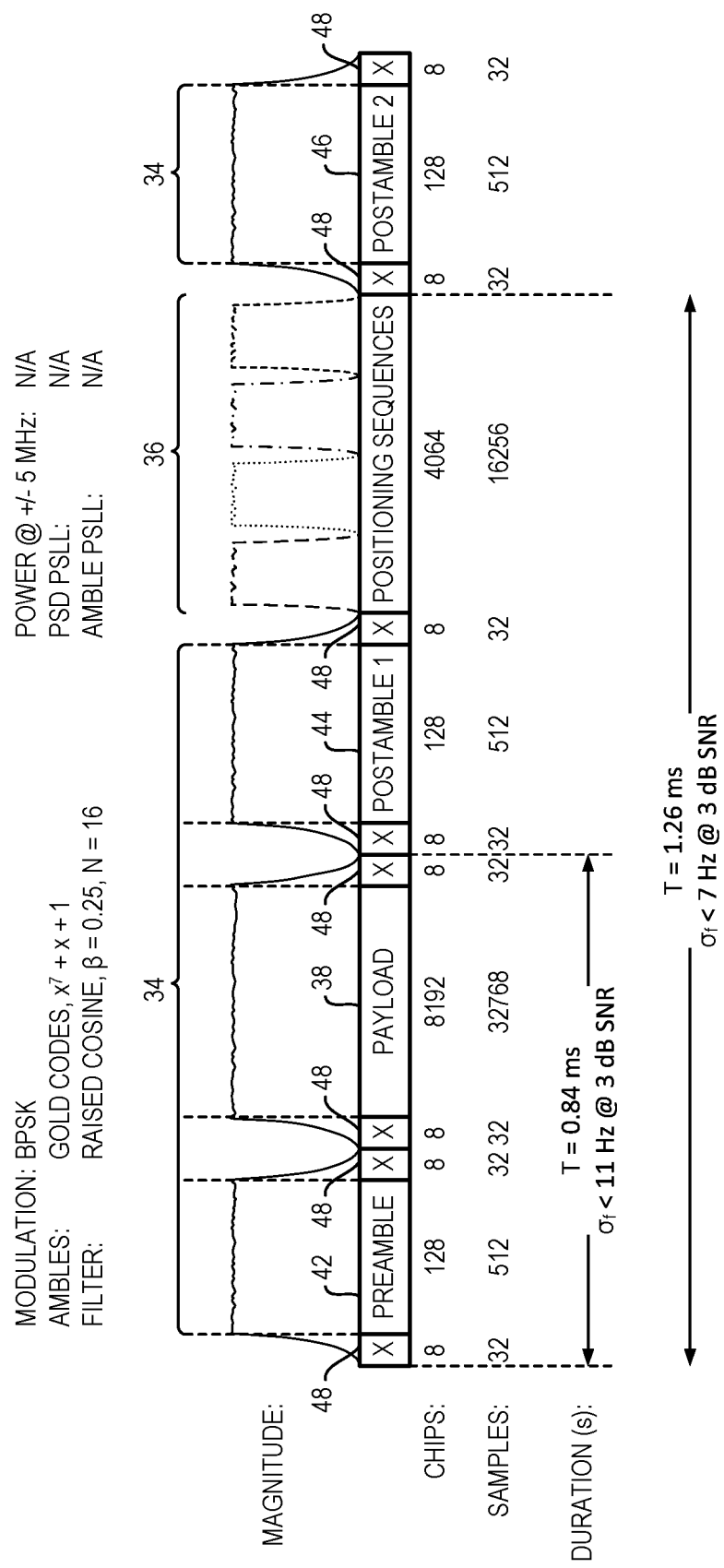
FIG. 5 is a schematic diagram of physical layer components of the joint positioning-communications waveform of FIGS. 4B and 4C.

These layers may be broadly categorized into 2 groups: media layers and host layers. Media layers handle the transmission and reception of data, while the host layers handle routing that information to different users and managing the network. FIGS. 4B and 4C illustrate exemplary data link layer protocols for the HPPC network 10. FIG. 5 illustrates an exemplary physical layer protocol for the HPPC network 10. Additional embodiments integrate the HPPC network 10 into LTE, 5G, or other cellular network protocols. An exemplary approach to cellular integration using LTE media layers is described below with respect to FIGS. 6A-6C.

FIG. 4B is a schematic diagram of an exemplary structure of a joint positioning-communications waveform 32 using the protocol of FIG. 4A. A transmission using the joint positioning-communications waveform 32 includes a communications segment 34 and a positioning segment 36. The communications segment 34 contains a data payload and several pilot sequences. In the exemplary joint positioning-communications waveform 32 of FIG. 4B, a CDD strategy is used. The CDD strategy consists of placing an orthogonal positioning waveform on each antenna ($Tx_1$, $Tx_2$, $Tx_3$, $Tx_4$) and transmitting them simultaneously.

FIG. 4C is a schematic diagram of another exemplary structure of the joint positioning-communications waveform 32 using the protocol of FIG. 4A. In this example, a TDD strategy is used. The TDD strategy consists of placing the same waveform on each antenna ($Tx_1$, $Tx_2$, $Tx_3$, $Tx_4$) but transmitting in different time slots. CDD allows longer waveform which increases signal-to-noise ratio (SNR) relative to TDD, but must account for inter-symbol interference which may limit performance.

In the examples of FIGS. 4B and 4C, the joint positioning-communications waveform 32 contains a data payload 38, several positioning sequences 40 for ToA estimation, a preamble 42, and post-ambles 44, 46 for acquisition and synchronization. The illustrated structure of the joint positioning-communications waveform 32 is for a network node (e.g., the second network node 22 of FIG. 2) with 4 antennas. The first half of the waveform 32 contains the data payload 38 and supporting amble sequences 42, 44, 46. The data payload 38 can be placed between a minimum shift keying (MSK) preamble 42 and post-amble 44, which are used by the receiver to acquire and synchronize the received waveform 32. The data payload 38 can be modulated using binary phase shift keying (BPSK). A second MSK post-amble 46 can be placed at the end of the waveform 32 to enable precise frequency corrections.

The second half of the waveform 32 contains the positioning sequences 40. These may be random MSK sequences that have been treated to have low cross correlation properties with each other. One positioning sequence 40 is transmitted from each transmit antenna ($Tx_1$ through $Tx_4$), following the CDD or TDD strategy. The TDD strategy can mitigate inter-symbol interference (ISI) at the receiver, which estimates the ToA of each sequence at each receive antenna. This further allows the receiver to unambiguously estimate the path length to each transmit antenna. For two 4-antenna network nodes, there are 16 transmit-receive links that can be estimated.

In an exemplary aspect, the data payload 38 includes a position state estimate, which can include delay, offset, radial acceleration, and/or clock frequency drift estimates, as well as relative range, position, velocity, acceleration, bearing, altitude, and/or orientation estimates. In some examples, the data payload 38 includes inertial information from an inertial navigation unit (which can include fused data from an accelerometer, gyroscope, global positioning system (GPS) device, optical data from a camera, etc.). In other examples, the data payload 38 can include distributed coherence information or beamforming information, which can be used to select antennas (e.g., where more than four antennas are available) and/or communication protocols which are best for communication and/or position estimation.

FIGS. 4B and 4C are illustrated with the communications segment 34 (including the data payload 38) transmitted from a first transmit antenna ($Tx_1$). It should be understood that embodiments of the joint positioning-communications waveform 32 can transmit portions of the communications segment 34 (e.g., portions or all of the data payload 38) from any of the transmit antennas ($Tx_1$, $Tx_2$, $Tx_3$, $Tx_4$), or combinations of the transmit antennas (including all of the transmit antennas).

FIG. 5 is a schematic diagram of physical layer components of the joint positioning-communications waveform 32 of FIGS. 4B and 4C. The length of each component is defined in a number of critical samples, or chips. In this example, the communications segment 34 consists of a preamble 42 (having a length of 128 chips), two post-ambles 44, 46 (each having a length of 128 chips), and a data payload 38 (having a length of 4064 chips). The preamble 42 and post-ambles 44, 46 are used to estimate frequency offsets for the communications processing chain.

The positioning segment 36 is a reserved segment that is occupied according to the CDD strategy of FIG. 4B or the TDD strategy of FIG. 4C. Empty buffers 48 are placed between each component to mitigate multi-path and inter-symbol interference.

LTE Protocol

LTE is the current state-of-the-art standard for mobile or cellular wireless communications. The salient feature of LTE is the usage of orthogonal frequency division multi-plexing (OFDM) along with cyclic prefixing (CP) as a digital modulation scheme for data transmission. OFDM splits the channel bandwidth into multiple narrow sub-bands (or sub-carriers) and transmits data across multiple sub-carriers at the same time. CP is a signal processing technique that takes an arbitrary number of samples from the end of an OFDM symbol and appends them to the beginning of the symbol. This is done to ensure that the sub-carriers remain orthogonal to each other when passing through channels with multi-path or frequency-selective fading. OFDM has many benefits, such as:
  Robust against frequency-selective fading and other narrow-band interference.
  Flexible transmission bandwidth support (by varying number of sub-carriers used).
  Increased spectral efficiency due to orthogonality between sub-carriers.
  Ability to multiplex in both time- and frequency-domain.

Each LTE subcarrier is set to be 15 kilohertz (kHz) wide. This sub-carrier spacing was chosen to maintain a balance between the CP overhead and sensitivity due to Doppler spread or multipath. This sub-carrier spacing also means that the duration of an OFDM symbol is 1/15000=66.7 microseconds (µs). In order to standardize transmission schemes, LTE also defines a number of channel bandwidths that can be used:
  1.4 MHz
  3 MHz
  5 MHz
  10 MHz
  15 MHz
  20 MHz LTE uses OFDM in both uplink and downlink transmission. However, despite its many advantages, OFDM has certain drawbacks such as high sensitivity to high peak-to-average power ratio (PAPR). PAPR occurs due to random constructive addition of sub-carriers and results in spectral spreading of the signal leading to adjacent channel interference.

It is a problem that can be overcome with high quality power amplifiers and amplifier linearization techniques. While these methods can be used in a base station, they become expensive on mobile devices and other user equipments (UEs). Hence, UEs use a single carrier multiplexing scheme called single carrier frequency division multiple access (SC-FDMA) with CP on the uplink which reduces PAPR as there is only a single carrier as opposed to multiple sub-carriers. This method is also called discrete Fourier transform-spread OFDM (DFTS-OFDM) because it is the same as using a discrete Fourier transform (DFT) pre-coder prior to OFDM modulation. In general, DFTS-OFDM behaves like a single-carrier system with a short symbol duration compared to OFDM.

Figure 6A:
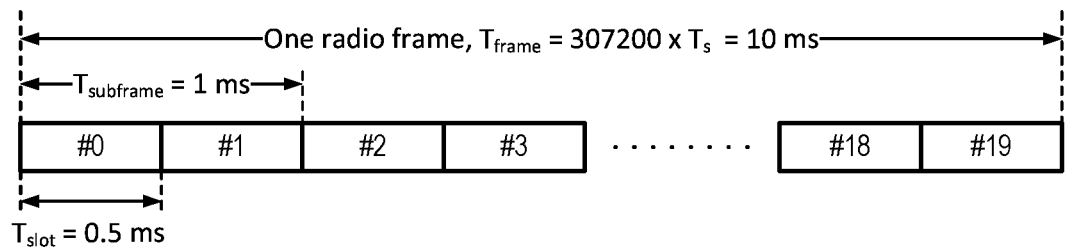
FIG. 6A is a schematic diagram of a structure of a long term evolution (LTE) frame, which can be adapted to include the joint positioning-communications waveform of the HPPC network of FIGS. 1-5.

FIG. 6A is a schematic diagram of a structure of an LTE frame, which can be adapted to include the joint positioning-communications waveform 32 of the HPPC network 10 of FIGS. 1-5. An LTE radio frame has a time duration of 10 ms. Each frame is further divided into 10 sub-frames of equal duration (1 ms). Each sub-frame includes two slots.

Figure 6B:
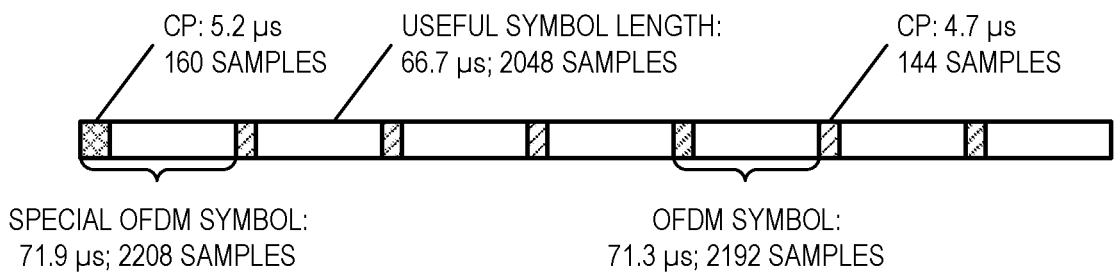
FIG. 6B is a schematic diagram of a structure of a slot in the LTE frame of FIG. 6A.

FIG. 6B is a schematic diagram of a structure of a slot in the LTE frame of FIG. 6A. Each sub-frame contains either 12 or 14 OFDM symbols, depending on whether a normal CP or extended CP is used. The typical LTE sub-frame consists of 14 OFDM symbols. Uplink and downlink scheduling is done on a sub-frame basis. In the frequency domain, the number of sub-carriers N ranges from 128 to 2048, depending on channel bandwidth, with 512 and 1024 for 5 MHz and 10 MHz, respectively, being most commonly used in practice.

Figure 6C:
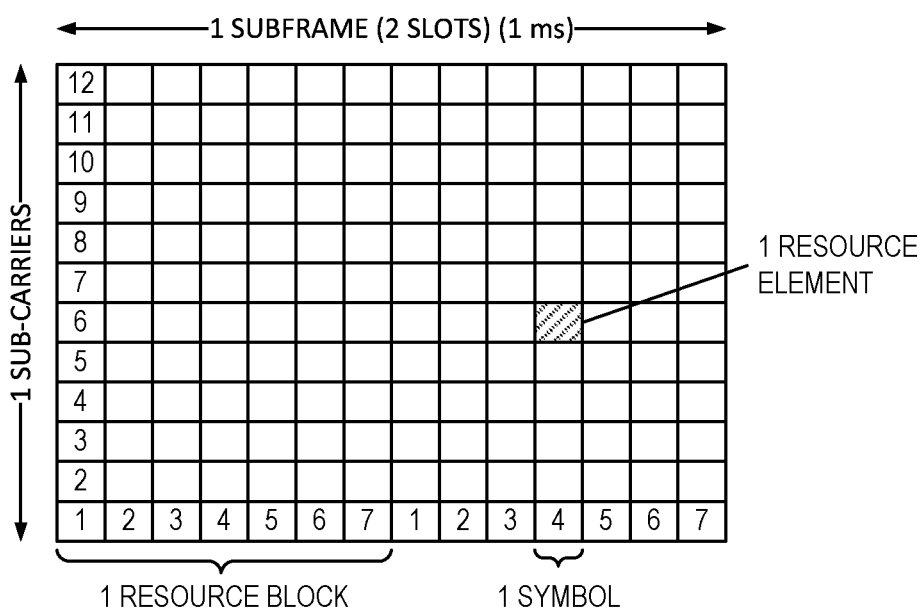
FIG. 6C is a schematic diagram of resource blocks and resource elements of the LTE frame of FIG. 6A.

FIG. 6C is a schematic diagram of resource blocks and resource elements of the LTE frame of FIG. 6A. LTE transmission can be scheduled by resource blocks, each of which consists of 12 consecutive sub-carriers, or 180 kHz, for the duration of one slot (0.5 ms). This granularity is selected to limit signaling overhead. A resource element is the smallest defined unit which consists of one OFDM sub-carrier during one OFDM symbol interval. Each resource block consists of 12×7=84 resource elements in case of normal CP (72 for extended CP).

Furthermore, the maximum transmit powers are defined in LTE as 46 dBm for a base station and 23 dBm for UE. Additionally, within the OFDM signal it is possible to choose between three types of modulation for the LTE signal:
  QPSK or 4-QAM (2 bits/symbol)
  16-QAM (4 bits/symbol)
  64-QAM (6 bits/symbol)

Within the LTE carrier bandwidth of up to 20 MHz, there are some sub-carriers that are faded and other are not faded. Transmission is done using those frequencies that are not faded. LTE uplink and downlink can be operated either using frequency division duplexing (FDD) or TDD. In FDD mode of operation, the uplink and downlink are transmitted across separate carrier frequencies, $f_{UL}$ and $f_{DL}$. Both the uplink and downlink transmit one LTE frame or 20 OFDM symbols simultaneously. Isolation or separation between uplink and downlink are achieved by duplex filters. All LTE base stations operating in FDD can operate as full-duplex transmitters/receivers. Guard intervals are used for UE devices that can only operate at half-duplex, which have a typical duration of 1 ms or 1 sub-frame. The range of carrier frequencies for LTE changes according to countries.

In TDD mode of operation, the uplink and downlink are transmitted across the same carrier frequency. During one LTE frame, some sub-frames are allocated for uplink and some for downlink. Switching between uplink and downlink transmission are done via a special sub-frame. The special sub-frame has three distinct parts:
  Downlink part: Used to transmit a small amount of LTE data.
  Guard interval: Empty guard period. The duration depends on a number of factors such as the size of the operating cell.
  Uplink part: Smaller duration than the downlink part, used for channel sounding, etc. No actual data is transferred in this section.

Similar to FDD, the range of carrier frequencies for LTE changes according to countries.

HPPC Integration with LTE

With continuing reference to FIGS. 6A-6C, integration of the joint positioning-communications waveform 32 of the HPPC network 10 of FIGS. 1-5 into the LTE standard is discussed. It should be understood that this is an illustrative embodiment of the HPPC network 10, and other embodiments may be integrated into other communication protocols in a similar manner.

Payload integration: The HPPC waveform was originally designed to accommodate a specifically-sized payload. To integrate this payload into the LTE standard, the size is adjusted and the payload is split into multiple slots.

Embodiments of the joint positioning-communications waveform 32 of FIG. 5 include a data payload 38 which is 8192 chips long. Each LTE slot contains 7 OFDM symbols, each of which has a useful symbol length of 2048 chips. The integrated data payload 38 must therefore be divided into at least 4 OFDM symbols. Depending on further additions to the content of the data payload 38, and to facilitate the receiver parsing the received LTE frames, it may be beneficial to expand the data payload 38 to cover all 7 OFDM symbols in a given slot. This would allow a payload length of 14336 chips, a 75% increase over the original joint positioning-communications waveform 32, and simplifies the receive chain processing.

Positioning integration: The positioning sequences 40 of FIGS. 4B and 4C are independent sequences that are treated to have low cross-correlations with each other. They do not necessarily need to be transmitted in sequence, as in FIG. 4C, as long as the transmit times are recorded and shared. The standard OFDM symbols in an LTE slot are 2192 chips long, which are already 119% longer than the positioning sequences 40, thus a single OFDM symbol should be sufficient for each positioning sequence 40.

There are only 7 symbols in an LTE slot, however, and given that the data payload 38 must occupy at least 4 of the symbols, all of the data payload 38 and all of the positioning sequences 40 cannot fit in a single slot. It can therefore be assumed that a transmission occupies at least 2 slots, preferably adjacent. If the joint positioning-communications waveform 32 of the HPPC network 10 is modified to fit 2 slots (14 OFDM symbols), then the LTE integration can support the following configurations:

Payload: 4 symbols, Positioning: 4 symbols, Extra: 6 symbols. This configuration most closely matches the current HPPC waveform design, with a slightly larger payload and doubly long positioning sequences. There are 6 extra symbols during which additional information can be added, such as pre- and post-ambles or additional positioning sequences to support more antennas.

Payload: 7 symbols, Positioning: 4 symbols, Extra: 3 symbols. This configuration expands the communications payload to accommodate more data as discussed above. This still leaves enough room for 4 positioning sequences and 3 reserved symbols for ambles or more antennas.

If the uplink can reserve two adjacent slots for the transmission of the payload and positioning sequences, the system has flexibility in terms of placing and ordering the transmit waveforms. Given the configurations listed above, reordering certain OFDM symbols may help mitigate multipath, inter-symbol interference, and time-frequency channel fading, as well as improve frequency offset estimates.

Frequency Offset Estimation: The HPPC system estimates frequency offsets by placing a pre-amble and post-amble around the communications payload, and a second post-amble after the positioning sequences. Both configurations above allow for these three sequences to be added at arbitrary locations, which may improve the frequency offset estimation by providing longer sequences to correlate and a large separation to reduce the estimator variance.

An alternative to using the pre-amble and post-ambles is to use the CP of the OFDM symbols to perform the carrier frequency offset estimation. Depending on the necessary precision, this may be sufficient for estimating the offset without the need for any additional pilot sequences, which allows the extra symbols to support increased data throughput or additional platform antennas.

Resource Allocation: Some embodiments of the HPPC system are defined as a point-to-point positioning-communications system, and therefore lack a protocol for distributing spectral and temporal access for large networks of users. The LTE standard defines how uplink and downlink transmissions are scheduled, and how different users are granted access to time-frequency resource elements. An integrated LTE HPPC data link layer must address the following concerns in this regard:

Time Slots: As discussed in a previous section, an HPPC network node needs two consecutive slots (2×0.5 ms) to complete a transmission. It can be assumed that all HPPC traffic is considered uplink traffic by the LTE network, and as such the integrated data link layer schedules uplink/downlink according to this constraint.

Frequency Slots: The RF receiver in an HPPC network node is sensitive to interference from nearby frequency bands. It is likely that nearby users operating in adjacent frequency allocations will interfere with each other, so the data link layer distributes HPPC traffic to avoid co-channel interference.

Traffic Dependent Scheduling: Depending on the volume of HPPC traffic, the data link layer may decide to allow a user to transmit over more than one frequency bin to increase throughput and positioning performance. A protocol is provided that identifies the available resources and appropriately allocates them.

Channel Dependent Scheduling: Because LTE operates over such a large frequency range, it is possible that some users may experience significantly greater fading in some frequency bins than others. If the network traffic is sufficiently low, it is possible to adaptively reallocate frequency slots to different users to maximize overall performance.

Network layer: For applications where network nodes are frequently entering and leaving the HPPC network 10, a network protocol can be automated to register users to maintain network performance and stability. This includes protocols that authenticate entrants and register them with the data link layer protocols, and removes them once they leave the area or their session ends.

Many potential HPPC applications require distribution of knowledge throughout the network, even between network nodes that do not share a direct link. The network layer protocols handle transfer of such information and how that traffic is managed. An integrated data link layer must define how this information is routed throughout the network, how to service each network node with as few resources as possible, and how to reduce redundancy to mitigate congestion.

Figure 7:
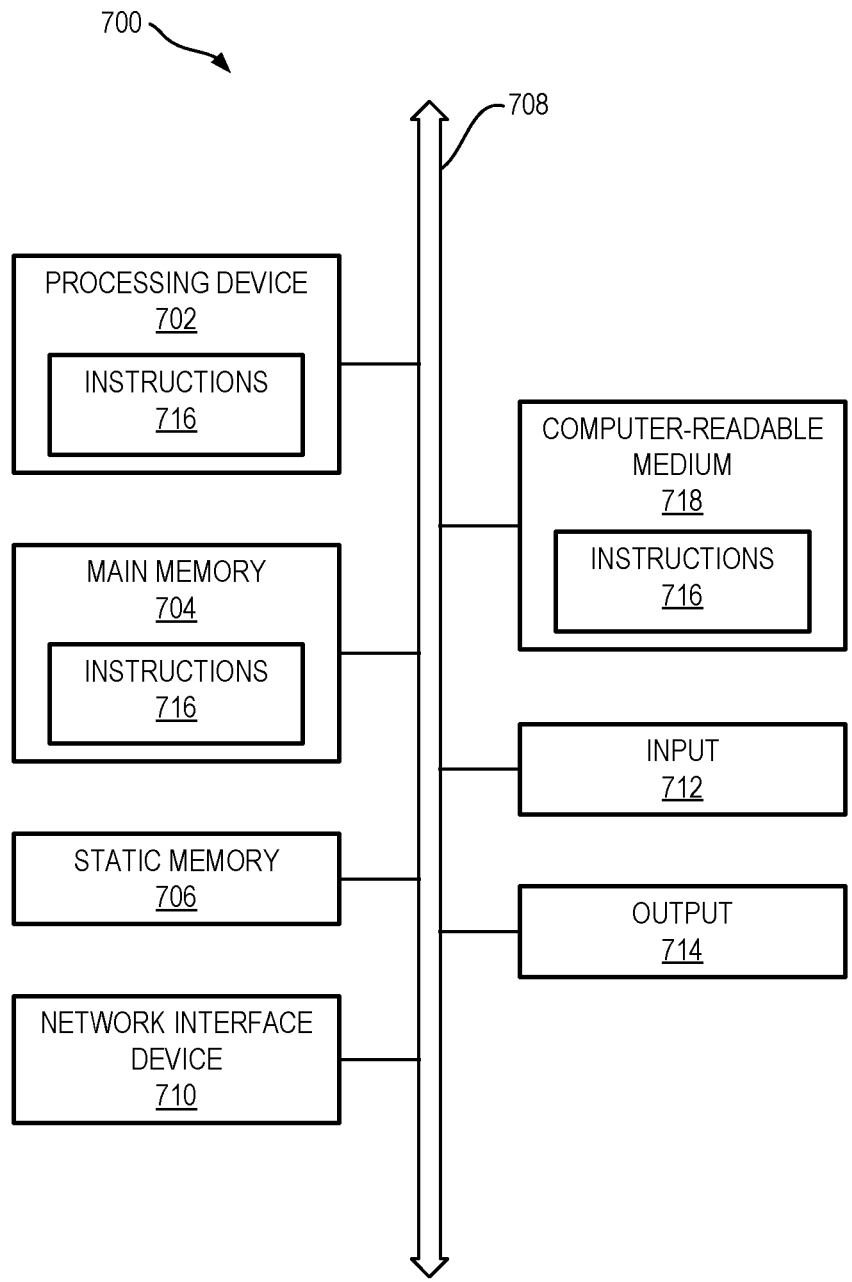
FIG. 7 is a schematic diagram of a generalized representation of an exemplary computer system that could be used to perform any of the methods or functions described herein, such as receiving, processing, and/or sending joint positioning-communications waveforms.

FIG. 7 is a schematic diagram of a generalized representation of an exemplary computer system 700 that could be used to perform any of the methods or functions described herein, such as receiving, processing, and/or sending joint positioning-communications waveforms. In some examples, a network node 20, 22 in the HPPC network 10 of FIGS. 1 and 2 is implemented as the computer system 700. In this regard, the computer system 700 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 700 in this embodiment includes a processing device 702 or processor (e.g., the signal processor 30 of FIG. 2), a main memory 704 (e.g., read-only memory (ROM), flash memory, dynamic random access memory (DRAM), such as synchronous DRAM (SDRAM), etc.), and a static memory 706 (e.g., flash memory, static random access memory (SRAM), etc.), which may communicate with each other via a data bus 708. Alternatively, the processing device 702 may be connected to the main memory 704 and/or static memory 706 directly or via some other connectivity means. In an exemplary aspect, the processing device 702 could be used to perform any of the methods or functions described above.

The processing device 702 represents one or more general-purpose processing devices, such as a microprocessor, central processing unit (CPU), or the like. More particularly, the processing device 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 702 is configured to execute processing logic in instructions for performing the operations and steps discussed herein.

The various illustrative logical blocks, modules, and circuits described in connection with the embodiments disclosed herein may be implemented or performed with the processing device 702, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 702 may be a microprocessor, or may be any conventional processor, controller, microcontroller, or state machine. The processing device 702 may also be implemented as a combination of computing devices (e.g., a combination of a DSP and a microprocessor, a plurality of microprocessors, one or more microprocessors in conjunction with a DSP core, or any other such configuration).

The computer system 700 may further include a network interface device 710. The computer system 700 also may or may not include an input 712, configured to receive input and selections to be communicated to the computer system 700 when executing instructions. The input 712 may include, but not be limited to, a touch sensor (e.g., a touch display), an alphanumeric input device (e.g., a keyboard), and/or a cursor control device (e.g., a mouse). In an exemplary aspect, the RF transceiver 24 of FIG. 2 is an input 712 to the computer system 700. The computer system 700 also may or may not include an output 714, including but not limited to a display, a video display unit (e.g., a liquid crystal display (LCD) or a cathode ray tube (CRT)), or a printer. In some examples, some or all inputs 712 and outputs 714 may be combination input/output devices. In an exemplary aspect, the RF transceiver 24 of FIG. 2 is also an output 714 of the computer system 700.

The computer system 700 may or may not include a data storage device that includes instructions 716 stored in a computer-readable medium 718. The instructions 716 may also reside, completely or at least partially, within the main memory 704 and/or within the processing device 702 during execution thereof by the computer system 700, the main memory 704, and the processing device 702 also constituting computer-readable medium. The instructions 716 may further be transmitted or received via the network interface device 710.

While the computer-readable medium 718 is shown in an exemplary embodiment to be a single medium, the term "computer-readable medium" should be taken to include a single medium or multiple media (e.g., a centralized or distributed database, and/or associated caches and servers) that store the one or more sets of instructions 716. The term "computer-readable medium" shall also be taken to include any medium that is capable of storing, encoding, or carrying a set of instructions for execution by the processing device 702 and that causes the processing device 702 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for receiving and processing joint positioning and communications, the method comprising:
 receiving a first signal comprising a joint positioning-communications waveform from a network node, the joint positioning-communications waveform comprising:
  a preamble;
  a data payload, wherein the data payload of the first signal comprises a first position state of the network node;
  a first positioning sequence; and
  a second positioning sequence; and
 estimating a second position state relative to the network node from the first signal.

2. The method of claim 1, wherein the second position state is estimated based on the first positioning sequence and the second positioning sequence.

3. The method of claim 2, wherein the second position state is further estimated based on the first position state.

4. The method of claim 2, wherein:
the joint positioning-communications waveform further comprises:
a third positioning sequence; and
a fourth positioning sequence; and
the second position state is further estimated based on the third positioning sequence and the fourth positioning sequence.

5. The method of claim 1, wherein:
receiving the first signal comprises receiving the first signal at each of a plurality of antennas; and
estimating the second position state comprises using estimating a time of flight from the network node to each of the plurality of antennas using the first positioning sequence and the second positioning sequence.

6. The method of claim 1, wherein the first positioning sequence is received simultaneously with the second positioning sequence.

7. The method of claim 1, wherein the second positioning sequence is received sequentially after the first positioning sequence.

8. The method of claim 1, wherein the joint positioning-communications waveform further comprises:
a first post-amble sequenced between the data payload and the first positioning sequence; and
a second post-amble sequenced after the second positioning sequence.

9. The method of claim 1, further comprising transmitting a second signal comprising the joint positioning-communications waveform in which the data payload comprises the second position state.

10. The method of claim 9, wherein transmitting the second signal comprises:
transmitting the first positioning sequence from a first antenna; and
transmitting the second positioning sequence from a second antenna.

11. The method of claim 10, wherein transmitting the second signal further comprises transmitting the preamble and the data payload from the first antenna.

12. The method of claim 10, wherein the first positioning sequence is transmitted simultaneously with the second positioning sequence.

13. The method of claim 10, wherein the second positioning sequence is transmitted sequentially after the first positioning sequence.

14. The method of claim 10, wherein transmitting the second signal comprising the joint positioning-communications waveform further comprises:
transmitting a third positioning sequence from a third antenna; and
transmitting a fourth positioning sequence from a fourth antenna.

15. The method of claim 10, wherein the joint positioning-communications waveform further comprises:
a first post-amble sequenced between the data payload and the first positioning sequence; and
a second post-amble sequenced after the second positioning sequence.

16. The method of claim 9, wherein the data payload of the second signal comprises additional information.

17. The method of claim 16, wherein the additional information comprises inertial information received from at least one of an inertial navigation unit, an accelerometer, a gyroscope, a global positioning system (GPS) device, or a camera.

18. The method of claim 17, wherein the additional information comprises at least one of distributed coherence information or beamforming information based on the second position state.

19. A network for joint positioning and communications, the network comprising:
a first network node, comprising:
a first signal transceiver configured to communicate wirelessly with a second network node; and
a first signal processor operable to:
estimate a first position state of the first network node relative to the second network node;
generate a joint positioning-communications waveform comprising:
a preamble;
a data payload;
a first positioning sequence; and
a second positioning sequence; and
cause the first signal transceiver to transmit a first signal comprising the joint positioning-communications waveform, wherein the data payload of the first signal comprises the first position state.

20. The network of claim 19, further comprising:
the second network node, comprising:
a second signal transceiver configured to communicate wirelessly with the first network node; and
a second signal processor operable to:
receive the first signal from the first network node;
estimate a second position state of the second network node relative to the first network node from the first signal; and
cause the second signal transceiver to transmit a second signal comprising the joint positioning-communications waveform, wherein the data payload of the second signal comprises the second position state.

* * * * *